Feb. 15, 1955     L. C. SECORD ET AL     2,701,949
MONOFUEL DECOMPOSER SYSTEM AND METHOD
Filed Nov. 2, 1950     3 Sheets-Sheet 1
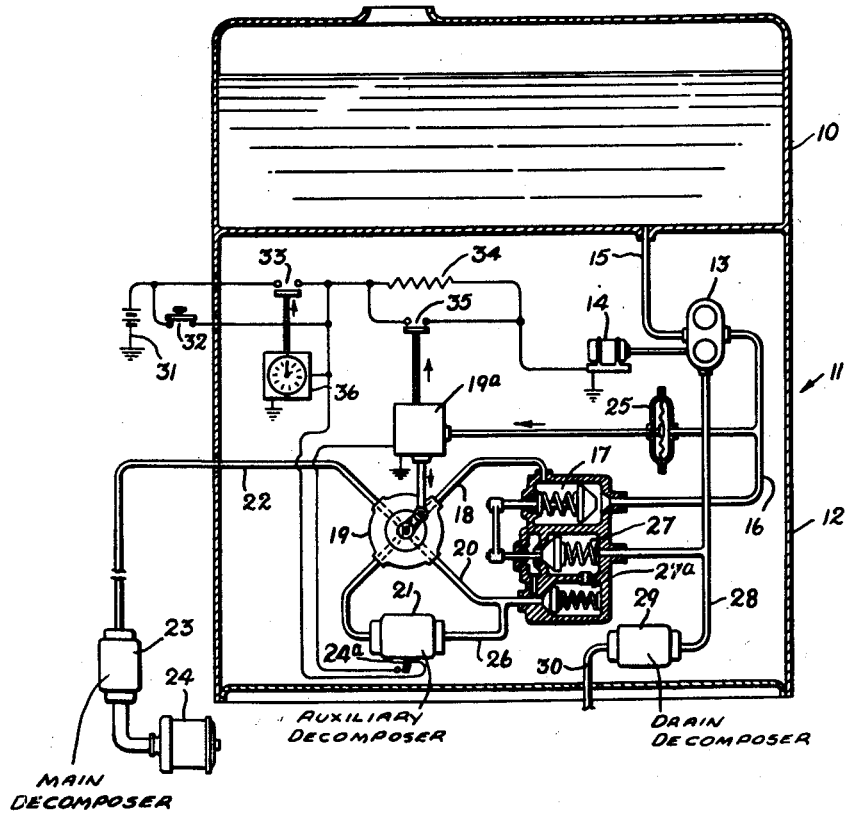
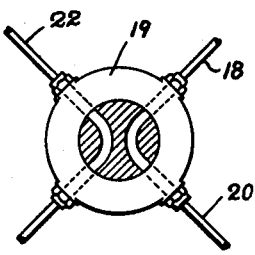
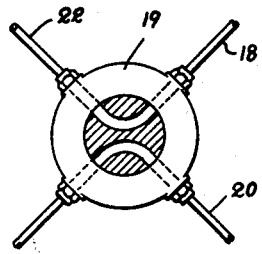
INVENTORS
W. BOYD
L. C. SECORD
PER
ATTORNEY Feb. 15, 1955  L. C. SECORD ET AL  2,701,949
MONOFUEL DECOMPOSER SYSTEM AND METHOD
Filed Nov. 2, 1950  3 Sheets-Sheet 3

INVENTORS
W. BOYD
L.C. SECORD
BY
Maybee & Legris
ATTORNEYS

United States Patent Office 2,701,949
Patented Feb. 15, 1955

2,701,949

MONOFUEL DECOMPOSER SYSTEM AND METHOD

Lloyd Calvin Secord, Toronto, Ontario, and Winnett Boyd, Bobcaygeon, Ontario, Canada, assignors to A. V. Roe Canada, Limited, Malton, Ontario, Canada, a corporation Application November 2, 1950, Serial No. 193,602

33 Claims. (Cl. 60—39.14)

This invention relates to systems and methods for supplying fuel from a reservoir to a catalytic monofuel decomposer and for initiating the operation of such decomposers, particularly when used with monofuel starting motors of aircraft gas turbine engines.

In monofuel decomposers energy is produced by the catalytic decomposition of the fuel into hot gases. Many types of catalyst, particularly solid catalysts, require preheating before the fuel is introduced to them since otherwise they will not achieve complete decomposition of the fuel; moreover if the catalyst is flooded, not only will a portion of the fuel in its original state be passed through into the motor connected to the decomposer but the life of the catalyst will be impaired. When the operation of the decomposer is initiated, it therefore is desirable that the catalyst should be heated before it is exposed to the full flow of fuel; this may be accomplished by initially applying to the catalyst a controlled small quantity of fuel which will not flood the catalyst in its cold condition. However in some installations such as those used in aircraft for starting motors operating on hydrogen peroxide fuel, consideration must be given to special problems such as the risk of the fuel freezing in cold pipe lines (hydrogen peroxide freezes at 11° F.) and the weight of the system. If, for example, the catalytic decomposer were situated in close proximity to the starting motor, when restarting an engine in flight there would be a great risk of the fuel freezing in the necessarily long pipe line from the reservoir to the catalyst, during the preheating operation at a low fuel delivery rate. On the other hand, if the decomposer were situated in close proximity to the reservoir to eliminate the aforesaid risk, the pipe line from the decomposer to the starting motor, which pipeline must conduct the relatively bulky gaseous products of decomposition, would have to be large and therefore relatively heavy, with attendant inconveniences of installation within the limited space available in an aircraft structure.

The main object of this invention is therefore to provide a system for preheating the catalyst so that it will not be flooded when exposed to the full flow of fuel. Another object of the invention is to provide a system for preheating the catalyst but which does not require the installation of the decomposer remotely from the starting motor and nevertheless is free of the possibility of the fuel freezing in the inlet line of the decomposer unit. Another object of the invention is to provide an automatic control of the aforesaid preheating means.

These objects are achieved by the provision of an auxiliary decomposer situated in proximity to the fuel reservoir and of an arrangement of valves and other controls whereby a restricted flow of fuel is directed upon the catalyst in the auxiliary decomposer and whereby the products from the auxiliary decomposer are directed upon the catalyst in the main decomposer until such time as the catalyst in the main decomposer is heated sufficiently to enable it to accommodate the full flow of fuel without flooding; the controls then automatically operate to direct the full flow of fuel upon the catalyst in the main decomposer, by-passing the auxiliary decomposer which is cut out from the system.

The invention will better be understood from the following description of a hydrogen peroxide starting motor installation and, though it will be noted that the installation described incorporates some devices peculiar to a starting motor which is required to run only for a predetermined period, it will be understood that the invention can be applied to decomposers for other types of motors using a monofuel and a catalyst. Reference is made to the accompanying drawings forming part of this specification, in which like reference characters refer to corresponding parts, and in which:

Fig. 1 is a diagrammatic layout of a system constructed in accordance with this invention;

Fig. 2 is a diagrammatic representation of the internal arrangement of the valve shown as item 19 in Fig. 1, during the preheating operation;

Fig. 3 is a diagrammatic representation of the internal arrangement of the valve shown as item 19 in Fig. 1, during the full flow operation of the system;

Figure 4:
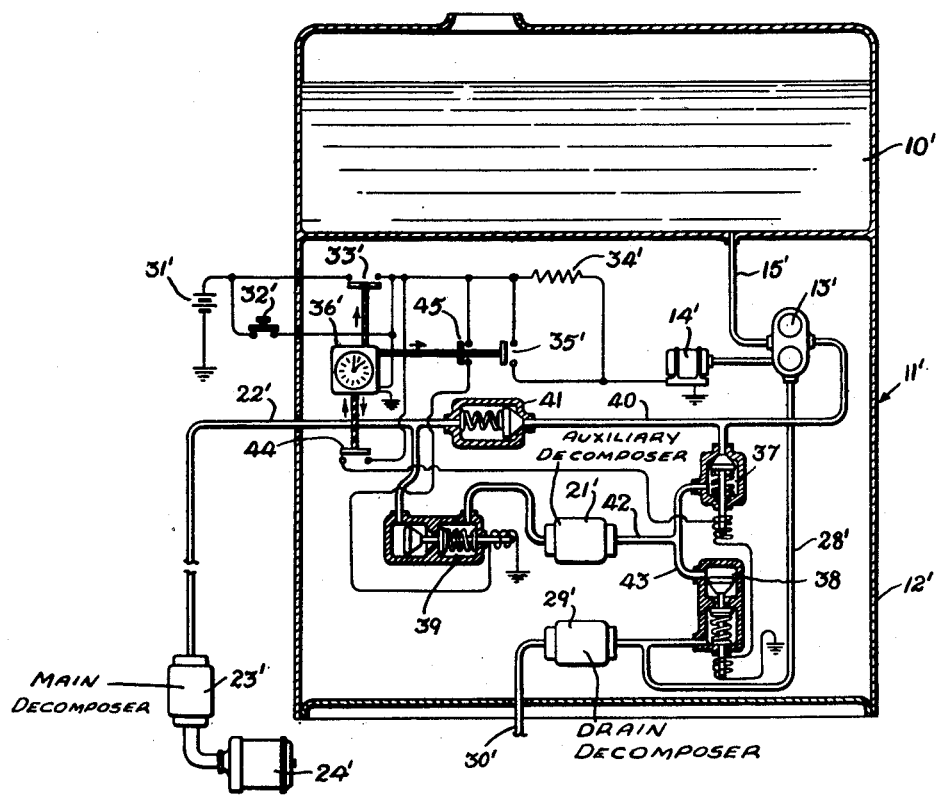
Fig. 4 is a diagrammatic layout of an alternative system constructed in accordance with this invention.

Referring first to the system illustrated in Fig. 1, hydrogen peroxide fuel is stored in a reservoir provided by the upper compartment 10 of a tank 11. In a lower compartment 12 is a pump 13 driven by a motor 14 and which induces fuel through a line 15 from the compartment 10 and discharges it by a line 16 through a one-way check valve 17, set to open at a predetermined pressure corresponding to the delivery pressure of the pump at low speed. After passing through the check valve 17 the fuel is transmitted through a line 18 to a two-position selector valve 19 having a controller 19$^a$ and which is provided with two alternative outlets, one connected through a line 20 to an auxiliary decomposer 21 and the other through a line 22 to a main decomposer 23 located adjacent to a starting motor 24. The valve 19 is normally set in the condition shown in Fig. 2, thus connecting the check valve 17 to the auxiliary decomposer 23; however its setting is governed by a bimetallic strip 24$^a$ or other temperature-sensitive device which energizes the controller 19$^a$ and is actuated by the temperature of the catalyst in the auxiliary decomposer 21 whereby at a predetermined temperature the selector valve is moved by the controller 19$^a$ to the condition shown in Fig. 3, connecting the check valve 17 directly to the main decomposer 23 through line 22. Once the selector valve is moved to the condition shown in Fig. 3 it is held in that condition by a pressure-sensitive control 25 acting in parallel with the bimetallic strip 24$^a$ and actuated by the delivery pressure of the pump 13.

The auxiliary decomposer 21 is connected by a line 26 to another check valve 27 which is mechanically coupled to the check valve 17 so that when the latter is closed the valve 27 is open; moreover there is in parallel with the check valve 27 a pressure operable valve 27$^a$ which is set to open at a predetermined pressure. The check valve 27 is connected through a line 28 to a drain decomposer 29 having a drain 30. The line 28 is also connected to the casing of pump 13 so that any leakage of fuel through its glands is also drained to the drain decomposer.

Electrical power is supplied to the motor 14 by a storage battery 31 or other source of electrical energy through a circuit which includes a push-button 32 and a normally-open switch 33 in parallel, having in series therewith a resistor 34 and a switch 35 in parallel to each other. Tapped in the said circuit is a timer 36 which is coupled to the switch 33 in such a manner that when the timer 36 is energized by the closing of the push-button the timer closes switch 33 thereby holding itself energized, switch 33 remaining closed until after the timer has completed its pre-set timing cycle. Switch 35 which short circuits resistor 34 is coupled to controller 19$^a$ so that the resistor 34 is short circuited when the selector valve 19 is moved to the position shown in Fig. 3.

To operate the starting motor, the push-button 32 is pressed, thereby initiating the operation of the timer 36 and also supplying electrical power to the pump motor 14. The operation of the timer closes switch 33 and holds it closed since in effect the timer is also a holding relay; therefore the push-button may forthwith be released and thereafter the starting cycle is automatic. Since the switch 35 is open at this initial stage the power to the motor 14 must pass through the resistor 34 and in consequence the speed of the motor is low and the fuel flow from the pump 13 is correspondingly limited.

The pressure of the fuel discharged from the pump through the line 16 causes the check valve 17 to open (thus causing the check valve 27 to close) thereby allowing the fuel to flow to the selector valve 19. The selector valve is at this time in the condition shown in Fig. 2 and the hydrogen peroxide is therefore directed through the line 20 to the auxiliary decomposer 21, where it reacts upon the catalyst, which may be in the form of a silver screen or other suitable catalytic agent, to form steam and oxygen at high temperature. These hot gases return to the selector valve and thence flow through the line 22 to the main decomposer 23. Since the hot gases are of relatively small volume the line 22 may be of small diameter.

The catalyst in the main decomposer 23 is heated by the hot gases aforesaid and at the same time the auxiliary decomposer 21 is heated by the reaction within it, and clearly, on a time basis, the temperature of the auxiliary decomposer will be an indirect indication of the temperature of the main decomposer. The temperature-sensitive control 24ª which is mounted on the auxiliary decomposer will, at a given temperature corresponding to a satisfactory temperature of the catalyst in the main decomposer, actuate the controller 19ª causing the selector valve 19 to shift to the position shown in Fig. 3, and the switch 35 to close, short-circuiting the resistor 34 and causing the motor 14 to increase its speed with consequent increase in the delivery of the pump 13 to full flow conditions. Thus a full flow of hydrogen peroxide is directed through the selector valve to the main decomposer 23, and the auxiliary decomposer 21 is by-passed. Any residual fuel in the auxiliary decomposer lines which comes into contact with the catalyst will generate hot gases under pressure, sufficient to overcome the setting of the pressure operable valve 27ª. The hot gases will then pass to the drain decomposer 29 and thence by the drain 30 to the outer atmosphere. The drain decomposer 29 is provided as a safeguard to react with any residual hydrogen peroxide, either in the auxiliary decomposer lines or leaking from the pump through the line 28, so that no dangerous residue in the form of liquid hydrogen peroxide will be discharged from the drain.

As the auxiliary decomposer cools, the control exercised on the controller 19ª and the selector valve 19 by the temperature-sensitive unit 24ª is relaxed: however the selector valve is held in the condition shown in Fig. 3 by the pressure-sensitive unit 25 actuated by the pressure in the delivery line 16 from the pump.

When the starting motor under the influence of the discharge from the main decomposer 23 has run for a predetermined period considered adequate to start the aircraft engine, the timer 36 opens the switch 33 causing the motor 14 and the pump 13 to come to a stop. The consequent fall of pressure in the lines 16, 18 and 22 releases the pressure-sensitive unit 25 which actuates the controller 19ª thus allowing the valve 19 to revert to the position shown in Fig. 2. Simultaneously the check valve 17 will close when the pressure falls below a predetermined value and, since the valves 17 and 27 are mechanically connected, the valve 27 will open. Thus the line 22 and the auxiliary decomposer lines, as far back as the check valve 17, are open to the drain decomposer 29 and any residual hydrogen peroxide in the system is free to drain out, being broken down into steam and oxygen by the drain decomposer before emerging from the drain 30.

The alternative system illustrated in Fig. 4 is similar in many respects to the system hereinbefore described. Hydrogen peroxide fuel is stored in a reservoir provided by the upper compartment 10' of a tank 11'. In a lower compartment 12' is a pump 13' driven by a motor 14' and which induces fuel from the compartment 10' through a line 15' and delivers it through a system including an auxiliary decomposer 21', finally discharging it through a line 22' to a main decomposer 23' situated adjacent the starting motor 24'. The system also embodies a drain decomposer 29', a drain 30' and a drain line 28' conducting any leakage from the pump glands to the drain decomposer. However the arrangement of valves in the auxiliary decomposer system differs from that of the previously described system; this alternative arrangement will be detailed hereunder.

It will be observed in passing that the electrical circuit to the motor 14' in this system is essentially the same as that in the first described system. Power from a battery 31' is supplied to the motor 14' through a circuit which includes a push-button 32' and a normally open switch 33' in parallel, having in series therewith a resistor 34' and a switch 35' in parallel to each other. A timer 36' is provided in the circuit, its function with respect to switch 33' being identical to that of the timer 36 in the first described circuit, but in addition it also controls the operation of switch 35' and three electromagnetically operated valves, as will be described.

The sequence of the operation is dependent upon the functioning of an inlet valve 37, a drain valve 38 and an outlet valve 39, all of which are electromagnetically operated under the control of the aforementioned timer 36'. A line 40 connected to the outlet of the pump 13' branches to the inlet valve 37, which is normally closed under the influence of a spring but opens when its electromagnet is energized, and to a pressure-operable valve 41 held in the closed position by a spring at a predetermined setting. A line 42 connects the inlet valve 37 to the inlet of the auxiliary decomposer 21' and the drain valve 38 is similarly connected to the inlet of the auxiliary decomposer by a line 43; the drain valve 38 is normally held open by a spring but is closed when its electromagnet is energized. The outlet valve 39 connects the outlet of the auxiliary decomposer to the main fuel line 22'; the outlet valve is normally held open by a spring but closes when its electromagnet is energized. Thus when the electromagnets of the valves 37, 38, and 39 are not energized, the inlet valve 37 is closed and the drain valve 38 and outlet valve 39 are open under the influence of their respective springs, whereas when the electromagnets are energized the inlet valve 37 is open and the drain valve 38 and outlet valve 39 are closed.

To set the starting cycle in operation the push-button 32' is pressed, thereby starting the timer and allowing power to flow to the motor 14' through the resistor 34'. The timer immediately closes the switch 33', permitting the push-button to be released and also closes a switch 44 which energizes the electromagnets of inlet valve 37 and drain valve 38, opening the former and closing the latter, against their respective springs. Since the switch 35' is open at this stage, the motor 14' will run at low speed because of the resistor 34' in the circuit and the pump 13' will consequently deliver only a limited flow of fuel.

The pump discharge is passed through the line 40 to the valves 37 and 41, but its pressure is insufficient to overcome the setting of the latter and it therefore flows through the valve 37 (which has been opened by the energization of its electromagnet) to the auxiliary decomposer 21'. The drain valve 38 having been closed by its electromagnet, no hydrogen peroxide can enter the drain decomposer 29' (other than by leakage past the glands of the pump, through the line 28').

In contact with the catalyst in the auxiliary decomposer 21', the hydrogen peroxide breaks down, forming steam and oxygen at a high temperature, and these gases pass through the outlet valve 39, which is held open by its spring, to the main line 22' leading to the main decomposer 23'.

The action described in the next preceding paragraph is allowed to continue for several seconds—the time depends upon the length of the line 22' and other factors, but normally 4 or 5 seconds is sufficient to heat the catalyst in the main decomposer—and then the timer simultaneously closes the switch 35' thus by-passing resistor 34', closes switch 45 thus energizing the electromagnet of the outlet valve 39 and closing the said valve against its spring, and opens the switch 44 thereby de-energizing the electromagnets of the valves 37 and 38 allowing these valves to close and open respectively under the influence of their springs.

When the resistor 34' is by-passed, the motor 14' will increase its speed and the pump will therefore deliver at full flow. Since the inlet valve 37 is closed at this juncture, the hydrogen peroxide from the pump will overcome the setting of the valve 41 and will flow through the line 22' to the main decomposer 23'. The catalyst in the main decomposer, having been preheated by the operation of the auxiliary decomposer, is capable of accommodating the full flow of the fuel without flooding, so that all the fuel is broken down to high temperature steam and oxygen to feed the starting motor 24'.

As in the first-described system, the auxiliary decomposer 21' is by-passed when the pump is delivering at full flow. Any residual hydrogen peroxide or steam and oxygen in the auxiliary decomposer system is free to drain through the open drain valve 38 into the drain decomposer 29' and the drain 30', the drain decomposer serving to break down any hydrogen peroxide present, so that no harmful residue will be discharged into the atmosphere.

Finally, after a predetermined time sufficient for the starting of the aircraft engine, the timer 36' causes the switches 33' and 35', and the switch 45 controlling the outlet valve 39 to open and the whole operation of the starter motor is concluded; the timer itself also ceases to function. The outlet valve 39 opens under the influence of its spring and the valve 41 closes due to the drop of pressure in the pump delivery. Thus any residual hydrogen peroxide in line 22', in the main decomposer 23' and in the auxiliary decomposer system is free to drain through the drain valve 38 into the drain decomposer 29' where it decomposes and whence it is discharged through the drain 30' to the atmosphere.

Figure 5:
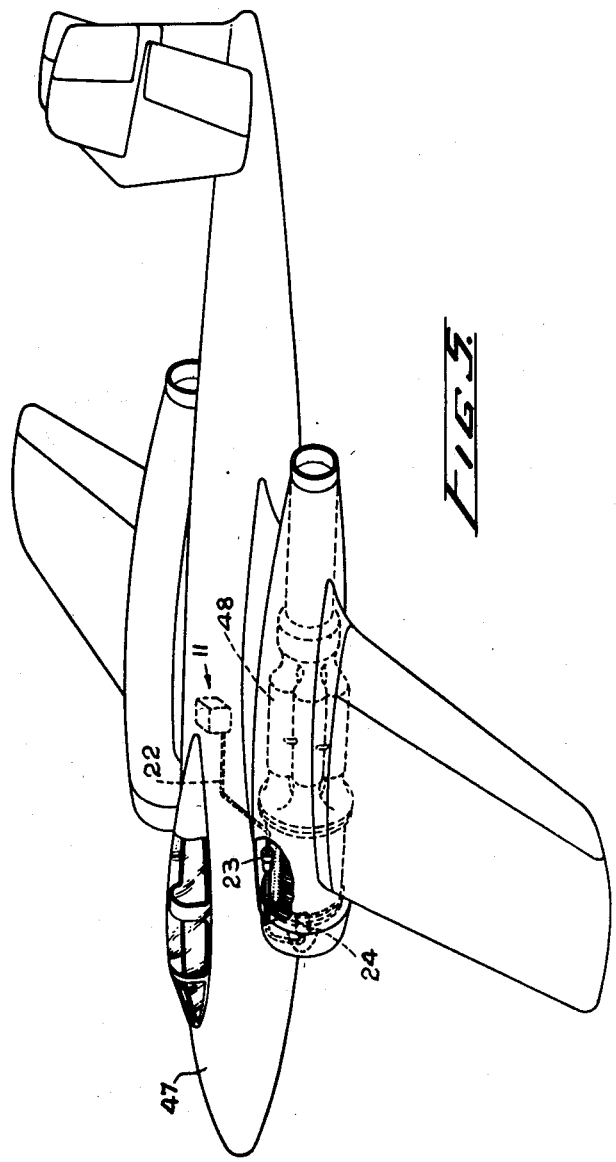
Fig. 5 is a view of an aircraft having an installed system according to the invention.

Fig. 5 shows the system of Fig. 1 installed in an aircraft 47, the starting motor 24 being part of a gas turbine engine 48. Since the aircraft illustrated has two engines it would of course have another main decomposer and starting motor, but these are not illustrated.

It will be readily understood that the two systems described are but typical arrangements for controlling the application of the auxiliary decomposer and that various changes in the control means and in the arrangement of the parts may be resorted to, without departing from the spirit of the invention or the scope of the subjoined claims.

What we claim as our invention is:

1. An apparatus for supplying monofuel from a reservoir to a catalytic monofuel main decomposer and for initiating the operation of the said decomposer, comprising a pump having its inlet connected to the reservoir, an auxiliary decomposer, a two-position valve adjustable in the first position to connect the outlet of the pump to the inlet of the auxiliary decomposer and the outlet of the auxiliary decomposer to the inlet of the main decomposer and in the second position to connect the outlet of the pump to the inlet of the main decomposer thereby by-passing the auxiliary decomposer, and a control for the valve to set initially the valve at the first position for preheating the main decomposer by the auxiliary decomposer and to set the valve at the second position after the main decomposer has been preheated.

2. An apparatus for supplying monofuel from a reservoir to a catalytic monofuel main decomposer and for initiating the operation of the said decomposer, comprising a pump having its inlet connected to the reservoir, an auxiliary decomposer, a two-position valve adjustable in the first position to connect the outlet of the pump to the inlet of the auxiliary decomposer and the outlet of the auxiliary decomposer to the inlet of the main decomposer and in the second position to connect the outlet of the pump to the inlet of the main decomposer thereby by-passing the auxiliary decomposer, a control for the valve normally urging the valve to the first position for preheating the main decomposer by the auxiliary decomposer, and temperature sensitive means responsive to the temperature of a decomposer to actuate the control to shift the valve to the second position after the main decomposer has been preheated.

3. An apparatus for supplying monofuel from a reservoir to a catalytic monofuel main decomposer and for initiating the operation of the said decomposer, comprising a pump having its inlet connected to the reservoir, an auxiliary decomposer, a drain decomposer, a two-position valve adjustable in the first position to connect the outlet of the pump to the inlet of the auxiliary decomposer and the outlet of the auxiliary decomposer to the inlet of the main decomposer and in the second position to connect the outlet of the pump to the inlet of the main decomposer thereby by-passing the auxiliary decomposer and to connect the auxiliary decomposer to the drain decomposer, a control for the valve to set the valve initially at the first position for the preheating of the main decomposer by the auxiliary decomposer and to set the valve subsequently at the second position after the main decomposer has been preheated thereby connecting the outlet of the pump to the inlet of the main decomposer and connecting the auxiliary decomposer to the drain decomposer.

4. An apparatus for supplying monofuel from a reservoir to a catalytic monofuel main decomposer and for initiating the operation of the said decomposer, comprising a pump having its inlet connected to the reservoir, an auxiliary decomposer, an electric motor for the pump, a two-position electrical power circuit to drive the motor at low speed in the first position thereby operating the pump at low fuel delivery rate and to drive the motor at high speed in the second position thereby operating the pump at high fuel delivery rate, a two-position valve adjustable in the first position to connect the outlet of the pump to the inlet of the auxiliary decomposer and the outlet of the auxiliary decomposer to the inlet of the main decomposer and in the second position to connect the outlet of the pump to the inlet of the main decomposer, a control for the valve and for the electrical power circuit to set the valve and the circuit initially at the first positions for preheating the main decomposer by the auxiliary decomposer at low fuel delivery rate and to set the valve and the circuit at the second positions after the main decomposer has been preheated to deliver monofuel directly from the pump to the main decomposer at a high rate.

5. An apparatus for supplying monofuel from a reservoir to a catalytic monofuel main decomposer and for initiating the operation of the said decomposer, comprising a pump having its inlet connected to the reservoir, an auxiliary decomposer, an electric motor for the pump, a two-position electrical power circuit to drive the motor at low speed in the first position thereby operating the pump at low fuel delivery rate and to drive the motor at high speed in the second position thereby operating the pump at high fuel delivery rate, a two-position valve adjustable in the first position to connect the outlet of the pump to the inlet of the auxiliary decomposer and the outlet of the auxiliary decomposer to the inlet of the main decomposer and in the second position to connect the outlet of the pump to the inlet of the main decomposer, a control for the valve and the electrical power circuit normally urging the valve and the circuit to the first positions for preheating the main decomposer by the auxiliary decomposer at low fuel delivery rate, and temperature sensitive means responsive to the temperature of a decomposer to actuate the control to shift the valve and the electrical power circuit to the second position after the main decomposer has been preheated to deliver monofuel directly from the pump to the main decomposer at a high rate.

6. An apparatus for supplying monofuel from a reservoir to a catalytic monofuel main decomposer and for initiating the operation of the said decomposer, comprising a pump having its inlet connected to the reservoir, an auxiliary decomposer, an electric motor for the pump, a two-position electrical power circuit to drive the motor at low speed in the first position thereby operating the pump at low fuel delivery rate and to drive the motor at high speed in the second position thereby operating the pump at high fuel delivery rate, a two-position valve adjustable in the first position to connect the outlet of the pump to the inlet of the auxiliary decomposer and the outlet of the auxiliary decomposer to the inlet of the main decomposer and in the second position to connect the outlet of the pump to the inlet of the main decomposer, a control for the valve and for the electrical power circuit normally urging the valve and the circuit to the first positions for preheating the main decomposer by the auxiliary decomposer at low fuel delivery rate, temperature sensitive means responsive to the temperature of a decomposer to actuate the control to shift the valve and the electrical circuit to the second positions after the main decomposer has been preheated to deliver monofuel directly from the pump to the main decomposer at a high rate, and means connected to the pump in parallel with the main decomposer responsive to the pressure of the monofuel when the pump is operating at high fuel delivery rate to hold the control in the second position after it has been shifted to the said second position by the temperature sensitive means.

7. An apparatus for supplying monofuel from a reservoir to a catalytic monofuel main decomposer and for initiating the operation of the said decomposer, comprising a pump having its inlet connected to the reservoir, an electric motor for the pump, a two-position electrical power circuit to drive the motor at low speed in the first position thereby operating the pump at low fuel delivery rate and to drive the motor at high speed in the second position thereby operating the pump at high fuel delivery rate, an auxiliary decomposer, a two-position valve adjustable in the first position to connect the outlet of the pump to the inlet of the auxiliary decomposer and the outlet of the auxiliary decomposer to the inlet of the main decomposer and in the second position to connect the outlet of the pump to the inlet of the main decomposer thereby by-passing the auxiliary decomposer, a normally closed one-way valve in series with the outlet of the pump and the inlet of the two-position valve adapted when open to permit a flow of monofuel from the pump to the two-position valve, a drain decomposer, another valve operatively linked with the one-way valve, the said other valve connecting the auxiliary decomposer to the drain decomposer when the one-way valve is closed and preventing flow of monofuel between the auxiliary decomposer and the drain decomposer when the one-way valve is open, a normally closed pressure-operable valve in parallel with the said other valve, the said pressure-operable valve opening to connect the auxiliary decomposer to the drain decomposer when the auxiliary decomposer is by-passed from the system and the pressure in the auxiliary decomposer exceeds a predetermined magnitude, a control for the two-position valve and for the electrical power circuit normally urging the two-position valve and the circuit to the first positions, the motor thus driving the pump at low fuel delivery rate which opens the one-way valve and closes the said other valve, the two-position valve thus permitting flow of monofuel from the pump to the main decomposer through the auxiliary decomposer to preheat the main decomposer, and the said other valve disconnecting the drain decomposer from the auxiliary decomposer, the control subsequently setting the two-position valve and the electrical power circuit at the second positions after the main decomposer has been preheated to by-pass the auxiliary decomposer and supply monofuel from the pump to the main decomposer at high delivery rate, monofuel in the auxiliary decomposer then escaping through the pressure-operable valve to the drain decomposer when the presser in the auxiliary decomposer exceeds a predetermined magnitude.

8. An apparatus for supplying monofuel from a reservoir to a catalytic monofuel main decomposer and for initiating the operation of the said decomposer, comprising a pump having an inlet connected to the reservoir, a primary fuel flow system from the outlet of the pump to the inlet of the main decomposer, an auxiliary decomposer, a secondary fuel flow system including the auxiliary decomposer also connecting the outlet of the pump with the inlet of the main decomposer, an electric motor for the pump, a circuit connecting the electric motor with a source of electrical power, a two-position motor controller in the circuit for causing the motor to operate at low speed in the first position and thereby operate the pump at low fuel delivery rate and for causing the motor to operate at high speed in the second position and thereby operate the pump at high fuel delivery rate, a valve in the secondary fuel flow system between the inlet of the auxiliary decomposer and the pump, electromagnetic means for operating the said valve, including a circuit to a source of electrical power, switching means for making and breaking the circuit to the electromagnetic means to operate the said valve, and means initially to set the motor controller at the first position and to actuate the switching means to valve opening position thereby supplying monofuel at low delivery rate to the auxiliary decomposer to preheat the main decomposer, and subsequently to set the motor controller at the second position and to actuate the switching means to valve closing position thereby delivering monofuel at high rate to the main decomposer which has been preheated and thereby also by-passing the fuel flow from the auxiliary decomposer.

9. An apparatus for supplying monofuel from a reservoir to a catalytic monofuel main decomposer and for initiating the operation of the said decomposer, comprising a pump having an inlet connected to the reservoir, a primary fuel flow system from the outlet of the pump to the inlet of the main decomposer, the said primary fuel flow system including a valve which is closed when the pump operates at low fuel delivery rate but which opens when the pump operates at high fuel delivery rate, an auxiliary decomposer, a secondary fuel flow system including the auxiliary decomposer also connecting the outlet of the pump with the inlet of the main decomposer, the secondary fuel flow system being thus in parallel with and by-passing the valve in the primary fuel flow system, an electric motor for the pump, a circuit connecting the electric motor with a source of electrical power, a two-position motor controller in the circuit for causing the motor to operate at low speed in the first position and thereby operate the pump at low fuel delivery rate and for causing the motor to operate at high speed in the second position and thereby operate the pump at high fuel delivery rate, an inlet valve in the secondary fuel flow system between the inlet of the auxiliary decomposer and the outlet of the pump, electromagnetic means for operating the inlet valve including a circuit to a source of electrical power, switching means for making and breaking the circuit to the electromagnetic means to operate the inlet valve, and means initially to set the motor controller at the first position and to actuate the switching means to inlet valve opening position thereby supplying monofuel at low delivery rate to the auxiliary decomposer to preheat the main decomposer, and subsequently to set the motor controller at the second position to operate the pump at high fuel delivery rate thereby opening the first-mentioned valve and delivering monofuel therethrough to the preheated main decomposer and also to actuate the switching means to inlet valve closing position thus by-passing the fuel flow from the auxiliary decomposer.

10. An apparatus for supplying monofuel from a reservoir to a catalytic monofuel main decomposer and for initiating the operation of the said decomposer, comprising a pump having an inlet connected to the reservoir, a primary fuel flow system from the outlet of the pump to the inlet of the main decomposer, the said primary fuel flow system including a normally closed pressure-operable valve which opens when the pump operates at high fuel delivery rate, an auxiliary decomposer, a secondary fuel flow system including the auxiliary decomposer also connecting the outlet of the pump with the inlet of the main decomposer, the secondary fuel flow system being thus in parallel with and by-passing the pressure-operable valve, an electric motor for the pump, a circuit connecting the electric motor with a source of electrical power, a two-position motor controller in the circuit for causing the motor to operate at low speed in the first position and thereby operate the pump at low fuel delivery rate and for causing the motor to operate at high speed in the second position and thereby operate the pump at high fuel delivery rate, an inlet valve in the secondary fuel flow system between the inlet of the auxiliary decomposer and the outlet of the pump, electromagnetic means for operating the inlet valve including a circuit to a source of electrical power, switching means for making and breaking the circuit to the electromagnetic means to operate the inlet valve, and means initially to set the motor controller at the first position and to actuate the switching means to inlet valve opening position thereby supplying monofuel at low delivery rate to the auxiliary decomposer to preheat the main decomposer, and subsequently to set the motor controller at the second position to operate the pump at high fuel delivery rate thereby opening the pressure-operable valve and delivering monofuel therethrough to the preheated main decomposer and also to actuate the switching means to inlet valve closing position thus by-passing the fuel flow from the auxiliary decomposer.

11. An apparatus for supplying monofuel from a reservoir to a catalytic monofuel main decomposer and for initiating the operation of the said decomposer, comprising a pump having an inlet connected to the reservoir, a primary fuel flow system from the outlet of the pump to the inlet of the main decomposer, the said primary fuel flow system including a normally closed pressure-operable valve which opens when the pump operates at high fuel delivery rate, an auxiliary decomposer, a secondary fuel flow system including the auxiliary decomposer also connecting the outlet of the pump with the inlet of the main decomposer, the secondary fuel flow system thus being in parallel with and by-passing the pressure-operable valve, an electric motor for the pump, a circuit connecting the electric motor with a source of electrical power, a two-position motor controller in the circuit for causing the motor to operate at low speed in the first position and thereby operate the pump at low fuel delivery rate and for causing the motor to operate at high speed in the second position and thereby operate the pump at high fuel delivery rate, a normally closed inlet valve in the secondary fuel flow system between the inlet of the auxiliary decomposer and the outlet of the pump, electromagnetic means for opening the inlet valve including a circuit to a source of electrical power, switching means for energizing the circuit to the electromagnetic means to open the inlet valve, and means initially to set the motor controller at the first position and to actuate the switching means to energize the electromagnetic means which opens the inlet valve thereby supplying monofuel at low delivery rate to the auxiliary decomposer to preheat the main decomposer, and subsequently to set the motor controller at the second position to operate the pump at high fuel delivery rate thereby opening the pressure-operable valve and delivering monofuel therethrough to the preheated main decomposer and also to actuate the switching means to deenergize the electromagnetic means thereby allowing the inlet valve to return to closed position and thus by-passing the fuel flow from the auxiliary decomposer.

12. An apparatus for supplying monofuel from a reservoir to a catalytic monofuel main decomposer and for initiating the operation of the said decomposer, comprising a pump having an inlet connected to the reservoir, a primary fuel flow system from the outlet of the pump to the inlet of the main decomposer, the said primary fuel flow system including a normally closed valve which opens when the pump operates at high fuel delivery rate, an auxiliary decomposer, a secondary fuel flow system including tthe auxiliary decomposer also connecting the outlet of the pump with the inlet of the main decomposer, the secondary fuel flow system thus being in parallel with and by-passing the valve in the primary fuel flow system, an electric motor for the pump, a circuit connecting the electric motor with a source of electrical power, a two-position motor controller in the circuit for causing the motor to operate at low speed in the first position and thereby operate the pump at low fuel delivery rate and for causing the motor to operate at high speed in the second position and thereby operate the pump at high fuel delivery rate, an inlet valve in the secondary fuel flow system between the inlet of the auxiliary decomposer and the outlet of the pump, electromagnetic means for operating the inlet valve including a circuit to a source of electrical power, switching means for making and breaking the circuit to the electromagnetic means to operate the inlet valve, an outlet valve in the secondary fuel flow system between the outlet of the auxiliary decomposer and the inlet of the main decomposer, electromagnetic means for operating the outlet valve including a circuit to a source of electrical power, switching means for making and breaking the circuit to the outlet valve electromagnetic means to operate the outlet valve, and means initially to set the motor controller at the first position and to actuate the switching means to inlet valve and outlet valve opening positions thereby supplying monofuel at low delivery rate to the auxiliary decomposer to preheat the main decomposer, and subsequently to set the motor controller at the second position to operate the pump at high fuel delivery rate thereby opening the first mentioned normally closed valve and delivering monofuel therethrough to the preheated main decomposer and also to actuate the switching means to inlet valve and outlet valve closing positions thus by-passing the fuel flow from the auxiliary decomposer.

13. An apparatus for supplying monofuel from a reservoir to a catalytic monofuel main decomposer and for initiating the operation of the said decomposer, comprising a pump having an inlet connected to the reservoir, a primary fuel flow system from the outlet of the pump to the inlet of the main decomposer, the said primary fuel flow system including a normally closed valve which opens when the pump operates at high fuel delivery rate, an auxiliary decomposer, a secondary fuel flow system including the auxiliary decomposer also connecting the outlet of the pump with the inlet of the main decomposer, the secondary fuel flow system thus being in parallel with and by-passing the valve in the primary fuel flow system, an electric motor for the pump, a circuit connecting the electric motor with a source of electrical power, a two-position motor controller in the circuit for causing the motor to operate at low speed in the first position and thereby operate the pump at low fuel delivery rate and for causing the motor to operate at high speed in the second position and thereby operate the pump at high fuel delivery rate, an inlet valve in the secondary fuel flow system between the inlet of the auxiliary decomposer and the outlet of the pump, electromagnetic means for operating the inlet valve, including a circuit to a source of electrical power, switching means for making and breaking the circuit to the electromagnetic means to operate the inlet valve, an outlet valve in the secondary fuel flow system between the outlet of the auxiliary decomposer and the inlet of the main decomposer, electromagnetic means for operating the outlet valve including a circuit to a source of electrical power, switching means for making and breaking the circuit to the outlet valve electromagnetic means to operate the outlet valve, a drain valve having its inlet connected to the inlet of the auxiliary decomposer and its outlet providing a drain, electromagnetic means for operating the drain valve including a circuit to a source of electrical power, switching means for making and breaking the circuit to the drain valve electromagnetic means to operate the drain valve, and means initially to set the motor controller at the first position and to actuate the switching means to inlet valve and outlet valve opening positions and to drain valve closing position thereby supplying monofuel at low delivery rate to the auxiliary decomposer to preheat the main decomposer, and subsequently to set the motor controller at the second position to operate the pump at high fuel delivery rate thereby opening the first mentioned normally closed valve and delivering monofuel therethrough to the preheated main decomposer and also to actuate the switching means to inlet valve and outlet valve closing positions and to drain valve opening position thus by-passing the fuel flow from the auxiliary decomposer and allowing the fuel in the secondary fuel flow system to drain therefrom.

14. An apparatus for supplying monofuel from a reservoir to a catalytic monofuel main decomposer and for initiating the operation of the said decomposer, comprising a pump having an inlet connected to the reservoir, a primary fuel flow system from the outlet of the pump to the inlet of the main decomposer, the said primary fuel flow system including a normally closed valve which opens when the pump operates at high fuel delivery rate. an auxiliary decomposer, a secondary fuel flow system including the auxiliary decomposer also connecting the outlet of the pump with the inlet of the main decomposer, the secondary fuel flow system thus being in parallel with and by-passing the valve in the primary fuel flow system, an electric motor for the pump, a circuit connecting the electric motor with a source of electrical power, a two-position motor controller in the circuit for causing the motor to operate at low speed in the first position and thereby operate the pump at low fuel delivery rate and for causing the motor to operate at high speed in the second position and thereby operate the pump at high fuel delivery rate, an inlet valve in the secondary fuel flow system between the inlet of the auxiliary decomposer and the outlet of the pump, electromagnetic means for operating the inlet valve, including a circuit to a source of electrical power, switching means for making and breaking the circuit to the electromagnetic means to operate the inlet valve, an outlet valve in the secondary fuel flow system between the outlet of the auxiliary decomposer and the inlet of the main decomposer, elctromagnetic means for operating the outlet valve including a circuit to a source of electrical power, switching means for making and breaking the circuit to the outlet valve electromagnetic means to operate the outlet valve, a drain valve having its inlet connected to the inlet of the auxiliary decomposer, a drain decomposer having an open outlet, the outlet of the drain valve being connected to the inlet of the drain decomposer, electromagnetic means for operating the drain valve including a circuit to a source of electrical power, switching means for making and breaking the circuit to the drain valve electromagnetic means to operate the drain valve, and means initially to set the motor controller at the first position and to actuate the switching means to inlet valve and outlet valve opening positions and to drain valve closing position thereby supplying monofuel at low delivery rate to the auxiliary decomposer to preheat the main decomposer, and subsequently to set the motor controller at the second position to operate the pump at high fuel delivery rate thereby opening the first mentioned normally closed valve and delivering monofuel therethrough to the preheated main decomposer and also to actuate the switching means to inlet valve and outlet valve closing positions and to drain valve opening position thus by-passing the fuel flow from the auxiliary decomposer and allowing the monofuel in the secondary fuel flow system to drain therefrom into the drain decomposer.

15. An apparatus for supplying monofuel from a reservoir to a catalytic monofuel main decomposer and for initiating the operation of the said decomposer, comprising a pump having its inlet connected to the reservoir, a primary fuel flow system from the outlet of the pump to the inlet of the main decomposer, the said primary fuel flow system including a normally closed pressure-operable valve which opens when the pump operates at high fuel delivery rate, an auxiliary decomposer, a secondary fuel flow system including the auxiliary decomposer also connecting the outlet of the pump with the inlet of the main decomposer, the secondary fuel flow system thus being in parallel with and by-passing the pressure-operable valve, an electric motor for the pump, a circuit connecting the electric motor with a source of electrical power, a two position motor controller in the circuit for causing the motor to operate at low speed in the first position and thereby operate the pump at low fuel delivery rate and for causing the motor to operate at relatively high speed in the second position and thereby operate the pump at high fuel delivery rate, a normally closed inlet valve in the secondary fuel flow system between the inlet of the auxiliary decomposer and the outlet of the pump, electromagnetic means for opening the inlet valve, including a circuit to a source of electrical power, switching means for energizing the circuit to the electromagnetic means to open the inlet valve, a normally open outlet valve in the secondary fuel flow system between the outlet of the auxiliary decomposer and the inlet of the main decomposer, electromagnetic means for closing the outlet valve including a circuit to a source of electrical power, switching means for energizing the circuit to the outlet valve electromagnetic means to close the outlet valve, a normally open drain valve having its inlet connected to the inlet of the auxiliary decomposer, a drain decomposer having an open outlet, the outlet of the drain valve being connected to the inlet of the drain decomposer, electromagnetic means for closing the drain valve including a circuit to a source of electrical power, switching means for energizing the circuit to the drain valve electromagnetic means to close the drain valve, and means initially to set the motor controller at the first position and to actuate the inlet valve switching means and the drain valve switching means to energize the electromagnetic means of the said valves to open the inlet valve and close the drain valve thereby supplying monofuel at low delivery rate to the auxiliary decomposer to preheat the main decomposer and also thereby disconnecting the drain decomposer from the system, and subsequently to set the motor controller at the second position to operate the pump at high fuel delivery rate thereby opening the pressure-operable valve and delivering monofuel therethrough to the preheated main decomposer and also to release the inlet valve switching means and the drain valve switching means to de-energize the electromagnetic means of the said valves thereby permitting the inlet valve to return to its normally closed position and the drain valve to return to its normally open position and to actuate the outlet valve switching means to energize the outlet valve electromagnetic means thereby closing the outlet valve, thus by-passing the fuel flow from the auxiliary decomposer and allowing the monofuel in the secondary fuel flow system to drain therefrom into the drain decomposer.

16. In an aircraft, a gas turbine engine, a catalytic monofuel main decomposer adjacent the engine, duct means connecting the main decomposer and the engine for supplying products of decomposition from the main decomposer to the engine, a monofuel reservoir remote from the main decomposer, and a fuel flow system from the reservoir to the main decomposer for supplying monofuel from the reservoir to the main decomposer and for initiating the operation of the main decomposer, the system including an auxiliary decomposer adjacent the reservoir, a conduit connected to the main decomposer, and valve means selectively adjustable firstly to connect the auxiliary decomposer between the reservoir and the conduit to supply monofuel from the reservoir to the auxiliary decomposer and to supply products of decomposition from the auxiliary decomposer through the conduit to the main decomposer to preheat the main decomposer and secondly, after the main decomposer has been preheated, to by-pass the auxiliary decomposer to supply monofuel from the reservoir through the conduit to the main decomposer, the conduit being of small cross-sectional area relative to the duct means connecting the main decomposer and the engine.

17. In an aircraft, a gas turbine engine, a catalytic monofuel main decomposer adjacent the engine, duct means connecting the main decomposer and the engine for supplying products of decomposition from the main decomposer to the engine, a monofuel reservoir remote from the main decomposer, and a fuel flow system from the reservoir to the main decomposer for supplying monofuel from the reservoir to the main decomposer and for initiating the operation of the main decomposer, the system including an auxiliary decomposer adjacent the reservoir, a conduit connected to the main decomposer, valve means selectively adjustable firstly to connect the auxiliary decomposer between the reservoir and the conduit to supply monofuel from the reservoir to the auxiliary decomposer, and to supply products of decomposition from the auxiliary decomposer through the conduit to the main decomposer to preheat the main decomposer and secondly, after the main decomposer has been preheated, to by-pass the auxiliary decomposer to supply monofuel from the reservoir through the conduit to the main decomposer, the conduit being of small cross-sectional area relative to the duct means connecting the main decomposer and the engine, and monofuel flow regulating means for providing a limited flow of monofuel from the reservoir to the auxiliary decomposer during preheating of the main decomposer and for providing an increased flow of monofuel from the reservoir to the main decomposer after the main decomposer has been preheated.

18. In an aircraft, a gas turbine engine, a catalytic monofuel main decomposer adjacent the engine, duct means connecting the main decomposer and the engine for supplying products of decomposition from the main decomposer to the engine, a monofuel reservoir remote from the main decomposer, and a fuel flow system from the reservoir to the main decomposer for supplying monofuel from the reservoir to the main decomposer and for initiating the operation of the main decomposer, the system including an auxiliary decomposer adjacent the reservoir, a conduit connected to the main decomposer, valve means selectively adjustable firstly to connect the auxiliary decomposer between the reservoir and the conduit to supply monofuel from the reservoir to the auxiliary decomposer, and to supply products of decomposition from the auxiliary decomposer through the conduit to the main decomposer to preheat the main decomposer and secondly, after the main decomposer has been preheated, to by-pass the auxiliary decomposer to supply monofuel from the reservoir through the conduit to the main decomposer, the conduit being of small cross-sectional area relative to the duct means connecting the main decomposer and the engine, and monofuel flow regulating means for providing a limited flow of monofuel from the reservoir to the auxiliary decomposer during preheating of the main decomposer and for providing an increased flow of monofuel from the reservoir to the main decomposer after the main decomposer has been preheated, and automatic control means for the valve means and the flow regulating means.

19. A method for initiating the operation of a catalytic monofuel decomposer and for preventing flooding thereof, comprising catalytically decomposing monofuel externally of the decomposer and directing the products of decomposition into the decomposer to preheat it, and, when the decomposer is preheated, ceasing to direct products of decomposition into the decomposer and thereafter supplying the decomposer with monofuel.

20. A method for initiating the operation of a catalytic monofuel main decomposer and for preventing flooding thereof, comprising supplying monofuel to an auxiliary monofuel decomposer and directing the products of decomposition from the auxiliary decomposer to the main decomposer to preheat it, and, when the main decomposer is preheated, supplying monofuel directly thereto.

21. A method for initiating the operation of a catalytic monofuel main decomposer and for preventing flooding thereof, comprising supplying monofuel to an auxiliary monofuel decomposer and directing the products of decomposition from the auxiliary decomposer through a conduit to the main decomposer to preheat it, and, when the main decomposer is preheated, by-passing the auxiliary decomposer and supplying monofuel directly to the main decomposer through the conduit.

22. A method for initiating the operation of a catalytic monofuel main decomposer and for preventing flooding thereof, comprising supplying monofuel at a low rate to a catalytic monofuel auxiliary decomposer and directing the products of decomposition from the auxiliary decomposer to the main decomposer to preheat it, and, when the main decomposer is preheated, supplying monofuel directly thereto at a higher rate.

23. A method for initiating the operation of a catalytic monofuel main decomposer and for preventing flooding thereof, comprising supplying monofuel at a low rate to a catalytic monofuel auxiliary decomposer and directing the products of decomposition from the auxiliary decomposer through a conduit to the main decomposer to preheat it, and, when the main decomposer is preheated, by-passing the auxiliary decomposer and supplying monofuel at a higher rate directly to the main decomposer through the conduit.

24. An apparatus for preheating a catalytic monofuel main decomposer and for supplying monofuel thereto from a reservoir, comprising an auxiliary decomposer, conduit means interconnecting the reservoir, the main decomposer and the auxiliary decomposer and including valve means selectively adjustable firstly to connect the auxiliary decomposer between the reservoir and the main decomposer to supply monofuel from the reservoir to the auxiliary decomposer and to supply products of decomposition from the auxiliary decomposer to the main decomposer to preheat the main decomposer and secondly, after the main decomposer has been preheated, to by-pass the auxiliary decomposer to supply monofuel from the reservoir to the main decomposer.

25. An apparatus for preheating a catalytic monofuel main decomposer and for supplying monofuel thereto from a reservoir, comprising an auxiliary decomposer, conduit means interconnecting the reservoir, the main decomposer and the auxiliary decomposer and including valve means selectively adjustable firstly to connect the auxiliary decomposer between the reservoir and the main decomposer to supply monofuel from the reservoir to the auxiliary decomposer and to supply products of decomposition from the auxiliary decomposer to the main decomposer to preheat the main decomposer and secondly, after the main decomposer has been preheated, to by-pass the auxiliary decomposer to supply monofuel from the reservoir to the main decomposer, and monofuel flow regulating means in the conduit means to provide a limited flow of monofuel to the auxiliary decomposer when the latter is connected by the valve means between the reservoir and the main decomposer and to provide a larger flow of monofuel to the main decomposer after it has been preheated.

26. An apparatus for preheating a catalyitc monofuel main decomposer and for supplying monofuel thereto from a reservoir, comprising an auxiliary decomposer, conduit means interconnecting the reservoir, the main decomposer and the auxiliary decomposer and including valve means selectively adjustable firstly to connect the auxiliary decomposer between the reservoir and the main decomposer to supply monofuel from the reservoir to the auxiliary decomposer and to supply products of decomposition from the auxiliary decomposer to the main decomposer to preheat the main decomposer and secondly, after the main decomposer has been preheated, to by-pass the auxiliary decomposer to supply monofuel from the reservoir to the main decomposer, and control means to select the adjustment of the valve means as aforesaid.

27. An apparatus for preheating a catalytic monofuel main decomposer and for supplying monofuel thereto from a reservoir, comprising an auxiliary decomposer, conduit means interconnecting the reservoir, the main decomposer and the auxiliary decomposer and including valve means selectively adjustable firstly to connect the auxiliary decomposer between the reservoir and the main decomposer to supply monofuel from the reservoir to the auxiliary decomposer and to supply products of decomposition from the auxiliary decomposer to the main decomposer to preheat the main decomposer and secondly, after the main decomposer has been preheated, to by-pass the auxiliary decomposer to supply monofuel from the reservoir to the main decomposer, control means to select the adjustment of the valve means as aforesaid, and means operative after the main decomposer has reached a predetermined temperature to actuate the control means to auxiliary decomposer by-passing position.

28. An apparatus for preheating a catalytic monofuel main decomposer and for supplying monofuel thereto from a reservoir, comprising a pump connected to the reservoir, an auxiliary decomposer, conduit means interconnecting the pump, the main decomposer and the auxiliary decomposer and including valve means selectively adjustable firstly to connect the auxiliary decomposer between the pump and the main decomposer to supply monofuel from the reservoir through the pump to the auxiliary decomposer and to supply products of decomposition from the auxiliary decomposer to the main decomposer to preheat the main decomposer and secondly, after the main decomposer has been preheated, to by-pass the auxiliary decomposer and supply monofuel from the reservoir through the pump to the main decomposer, control means to select the adjustment of the valve means as aforesaid and to select the monofuel delivery rate of the pump, and means operative after the main decomposer has reached a predetermined temperature to actuate the control means to auxiliary decomposer by-passing position and to increase the monofuel delivery rate of the pump.

29. An apparatus for preheating a catalytic monofuel main decomposer and for supplying monofuel thereto from a reservoir, comprising a pump connected to the reservoir, an auxiliary decomposer, conduit means interconnecting the pump, the main decomposer and the auxiliary decomposer and including valve means selectively adjustable firstly to connect the auxiliary decomposer between the pump and the main decomposer to supply monofuel from the reservoir through the pump to the auxiliary decomposer and to supply products of decomposition from the auxiliary decomposer to the main decomposer to preheat the main decomposer and secondly, after the main decomposer has been preheated, to by-pass the auxiliary decomposer and supply monofuel from the reservoir through the pump to the main decomposer, control means to select the adjustment of the valve means as aforesaid and to select the monofuel delivery rate of the pump, and temperature sensitive means responsive to the temperature of one of the decomposers to actuate the control means to auxiliary decomposer by-passing position and to increase the monofuel delivery rate of the pump.

30. An apparatus for preheating a catalytic monofuel main decomposer and for supplying monofuel thereto from a reservoir, comprising an auxiliary decomposer, conduit means interconnecting the reservoir, the main decomposer and the auxiliary decomposer and including valve means selectively adjustable firstly to connect the auxiliary decomposer between the reservoir and the main decomposer to supply monofuel from the reservoir to the auxiliary decomposer and to supply products of decomposition from the auxiliary decomposer to the main decomposer to preheat the main decomposer and secondly, after the main decomposer has been preheated, to by-pass the auxiliary decomposer to supply monofuel from the reservoir to the main decomposer, control means to select the adjustment of the valve means as aforesaid, and a delayed action device to actuate the control means to auxiliary decomposer by-passing position after the monofuel has been supplied to the auxiliary decomposer for a predetermined time.

31. An apparatus for preheating a catalytic monofuel main decomposer and for supplying monofuel thereto from a reservoir, comprising an auxiliary decomposer, conduit means interconnecting the reservoir, the main decomposer and the auxiliary decomposer and including valve means selectively adjustable firstly to connect the auxiliary decomposer between the reservoir and the main decomposer to supply monofuel from the reservoir to the auxiliary decomposer and to supply products of decomposition from the auxiliary decomposer to the main decomposer to preheat the main decomposer and secondly, after the main decomposer has been preheated, to by-pass the auxiliary decomposer to supply monofuel from the reservoir to the main decomposer, a drain decomposer adapted to be connected to the auxiliary decomposer, and other valve means operating in unison with the first mentioned valve means to connect the drain decomposer to the auxiliary decomposer when the latter is by-passed.

32. An apparatus for preheating a catalytic monofuel main decomposer and for supplying monofuel thereto from a reservoir, comprising a pump, an auxiliary decomposer, conduit means interconnecting the reservoir, the pump, the main decomposer and the auxiliary decomposer and including valve means selectively adjustable firstly to connect the reservoir, pump, auxiliary decomposer and main decomposer in series to supply monofuel from the reservoir through the pump to the auxiliary decomposer and to supply products of decomposition from the auxiliary decomposer to the main decomposer to preheat the main decomposer and secondly, after the main decomposer has been preheated, to by-pass the auxiliary decomposer and supply monofuel from the reservoir through the pump to the main decomposer, and a drain decomposer connected to the pump for decomposing and disposing of any monofuel leaking from the pump.

33. An apparatus for preheating a catalytic monofuel main decomposer and for supplying monofuel thereto from a reservoir, comprising a low and high delivery rate pump, adjustable means to condition the pump to operate at either delivery rate, an auxiliary decomposer, conduit means interconnecting the reservoir, the pump, the main decomposer and the auxiliary decomposer and including valve means selectively adjustable firstly to connect the reservoir, pump, auxiliary decomposer and main decomposer in series to supply monofuel from the reservoir through the pump to the auxiliary decomposer and to supply products of decomposition from the auxiliary decomposer to the main decomposer to preheat the main decomposer and secondly, after the main decomposer has been preheated, to by-pass the auxiliary decomposer and supply monofuel from the reservoir through the pump to the main decomposer, control means to select the adjustment of the valve means and of the pump delivery rate conditioning means, the control means initially adjusting the valve means to supply monofuel to the auxiliary decomposer and adjusting the conditioning means to operate the pump at low monofuel delivery rate, and the control means after the main decomposer has been preheated to a predetermined extent adjusting the valve means to by-pass the auxiliary decomposer and adjusting the conditioning means to operate the pump at high monofuel delivery rate.

References Cited in the file of this patent

UNITED STATES PATENTS

| | | |
|---|---|---|
| 719,332 | Herreshoff | Jan. 27, 1903 |
| 2,262,195 | Noack | Nov. 11, 1941 |
| 2,504,415 | Hepp | Apr. 18, 1950 |
| 2,548,268 | Metsger | Apr. 10, 1951 |